United States Patent [19]

Schwellenbach

[11] 3,965,456

[45] *June 22, 1976

[54] VEHICLE SAFETY DEVICE FOR MONITORING THE OPERATION OF DIRECTIONAL SIGNAL LAMPS

[76] Inventor: Robert D. Schwellenbach, 515 E. Missouri, Pierre, S. Dak. 57501

[ * ] Notice: The portion of the term of this patent subsequent to Oct. 8, 1991, has been disclaimed.

[22] Filed: Jan. 17, 1974

[21] Appl. No.: 434,249

[52] U.S. Cl. ............................... 340/79; 340/80; 340/81 R; 340/251
[51] Int. Cl.² .......................................... B60Q 1/26
[58] Field of Search ................ 340/79, 75, 80, 84, 340/85, 251, 81 R, 331, 82, 252 R, 52 R; 315/129, 130, 131, 132, 133, 136

[56] References Cited
UNITED STATES PATENTS

| | | | |
|---|---|---|---|
| 3,355,708 | 11/1967 | Perry | 340/251 |
| 3,593,274 | 7/1971 | Krugler | 340/80 |
| 3,641,490 | 2/1972 | Kawai | 340/251 |
| 3,719,937 | 3/1973 | Doyle | 340/251 |
| 3,840,852 | 10/1974 | Schwellenbach | 340/80 |

*Primary Examiner*—John W. Caldwell
*Assistant Examiner*—Donnie L. Crosland
*Attorney, Agent, or Firm*—Williamson, Bains & Moore

[57] ABSTRACT

A vehicle safety device for monitoring directional signal lamps comprises a plurality of directional signal monitor lights positioned on the dashboard of a motor vehicle, a monitor light being associated with each set of directional signal lamps with each monitor light being connected to a plurality of monitor diodes. Each monitor diode is connected downstream of a current detection apparatus connected to detect current flow through a predetermined signal lamp and in response to such current flow to close a switch, permitting current to flow from a directional signal power switch through the monitor diode to a monitor light, thereby indicating that the predetermined signal lamp is operational. An alarm apparatus is also provided to alert the operator when a signal lamp becomes inoperative.

3 Claims, 1 Drawing Figure

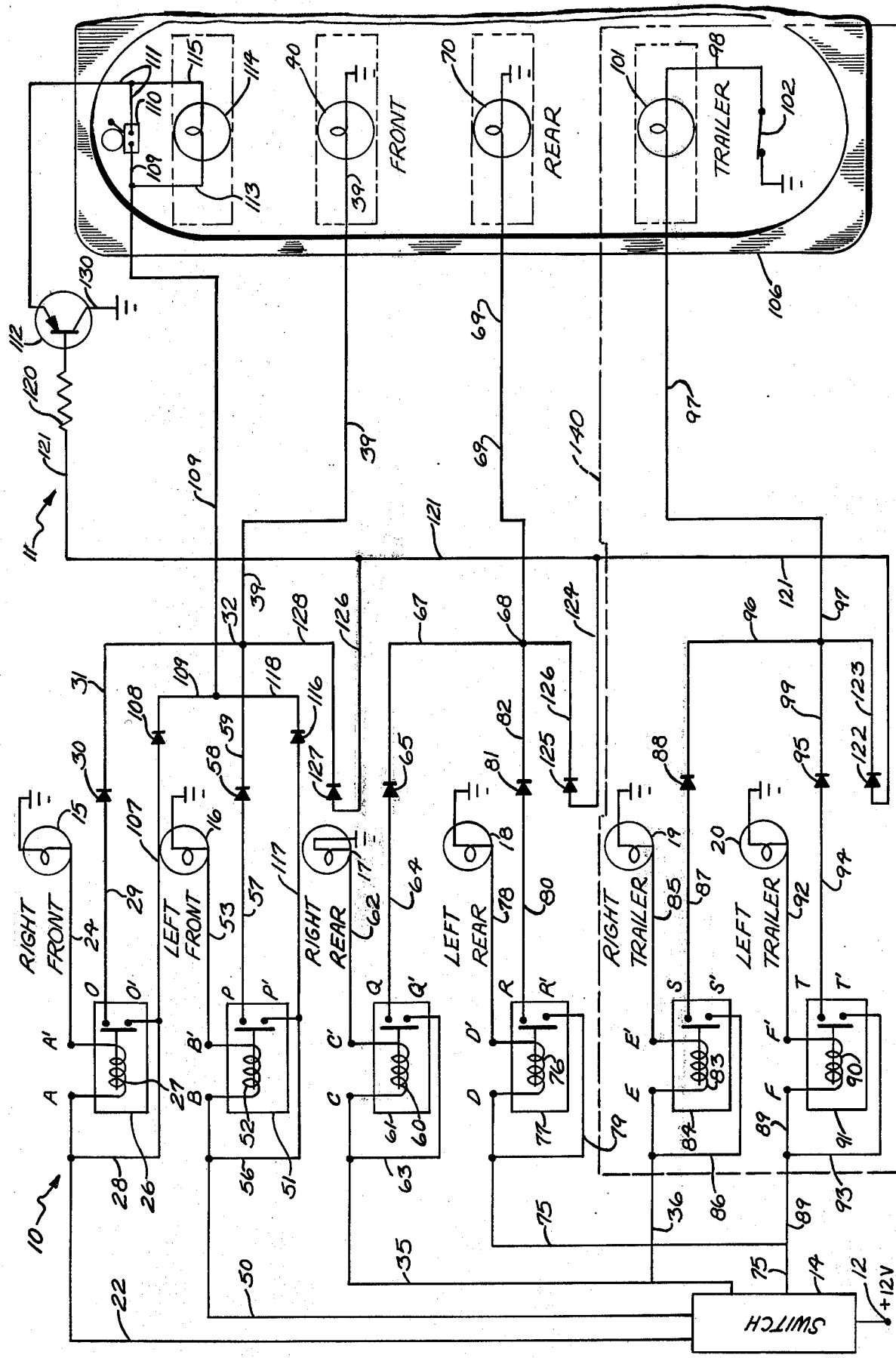

VEHICLE SAFETY DEVICE FOR MONITORING THE OPERATION OF DIRECTIONAL SIGNAL LAMPS

CROSS-REFERENCE TO RELATED APPLICATION

The invention is an improvement over that disclosed in copending U.S. Pat. application Ser. No. 323,234 filed January 12, 1973, now U.S. Pat. No. 3,840,852 by Robert D. Schwellenbach and entitled "Device for Monitoring the Operation of Directional Signal Lamps and Other Electrical Components."

BACKGROUND OF THE INVENTION

The invention relates to the field of motor vehicle directional signal lamps and provides a reliable and long-lasting device to monitor such lamp operation and to alert an operator when a signal lamp becomes inoperative.

Efficient and safe operation of motor vehicles is strongly dependent on vehicles having operational directional signal lamps for indicating a turn or lane change. Most drivers assume that their directional signal lamps are operational but do not regularly inspect them. Accordingly, it is of pressing importance that a driver be warned immediately when one or more directional signal lamps fail. Without such warning the likelihood of life-endangering accident is greatly increased, and so also is the risk of damage to the valuable cargoes carried by modern trucks and trailers.

SUMMARY OF THE INVENTION

The invention utilizes a plurality of directional signal monitor lights, one monitor light being provided to monitor operation of each set of directional signal lamps. A plurality of current detection apparatuses is used, each apparatus having a switch and connected with a directional signal lamp. The detection apparatus closes the switch when current flow through the associated directional signal lamp is detected and otherwise keeps the switch in open condition. One terminal of the switch is connected directly to the directional signal power switch and energized therefrom while the remaining terminal of the switch is connected to a monitor diode which is electrical connected in series between the switch and a monitor light. A plurality of monitor diodes is used with the vehicle safety device, one monitor diode being connected with each detection apparatus. Accordingly, each time a directional signal lamp flashes, the associated detection apparatus detects current flow to the signal lamp and closes its switch, resulting in current flowing from the directional signal power switch through the switch, through monitor diode and to the monitor light, causing the monitor light to flash in unison with the turn signal lamp, indicating that the turn signal lamp is operating normally.

An alarm apparatus having a plurality of alarm diodes and a transistor switch is electrically connected downstream of the monitor diodes and provides an audible and visual indication when a directional signal lamp fails. Accordingly, the invention gives immediate warning to the operator when failure of any directional signal lamp occurs. The invention not only warns that a lamp has failed, but indicates the particular front, rear, or truck-trailer directional signal lamp which has become inoperative.

The invention operates with a minimum amount of energy and does not interfere with normal operation of directional signal lamps of the vehicle. Even if the invention itself should fail, it has no adverse effect upon the monitored directional signal lamps. The invention is relatively inexpensive, simple to manufacture and install, and is easily added to existing motor vehicles as an accessory or built in as original equipment.

BRIEF DESCRIPTION OF THE DRAWING

The drawing is a schematic electrical circuit diagram of an embodiment of the invention shown in use for monitoring the operation of the directional signal lamps of a motor vehicle.

DESCRIPTION OF THE PREFERRED EMBODIMENT

Referring now to the drawing, the device 10 has a power supply 12 which may be a conventional automobile 12-volt battery. A directional signal power switch 14 is connected in series with the power supply 12 and is of the type used on the steering column of most modern automobiles.

The vehicle directional signal lamps which will be monitored by the device 10 are lamps 15, 16, 17, 18, 19 and 20, of which the odd-numbered lamps represent right-turn signal lamps and the even-numbered lamps left-turn signal lamps. Signal lamps 15 and 16 from a first pair of directional signal lamps and are representative of the front directional signal lamps on a car or truck. Signal lamps 17 and 18 form a second pair of directional signal lamps and are representative of the rear signal lamps on an automobile or truck-tractor. Signal lamps 19 and 20 form a third pair of directional signal lamps and are representative of the signal lamps at the rearward end of a trailer. Conductor 22 extends from the switch 14 to terminal A of relay 26, a second conductor 24 then extending from terminal A' of relay 26 to the front right-signal lamp 15 which is grounded to the vehicle chassis.

The relay 26 is typically a reed relay, although it should be understood that other relays can be used. The relay 26 has its holding coil 27 connected in series between the power switch 14 and the signal lamp 15, requiring that current flowing through the lamp 15 must first pass through the holding coil 27 of the relay 26. Terminals 0–0' of relay 26 are normally open, and close only when holding coil 27 is energized by current flow to the signal lamp 15. When closed, current flows from battery 12, through switch 14, along conductors 22 and 28, through terminals 0'–0 and along conductor 29. A monitor diode 30 is connected in series with conductor 31 extends from the diode 30 to junction 32. A conductor 39 extends from junction point 32 to monitor light 40 which is grounded to the vehicle chassis and mounted on the control panel 106 which preferably is positioned on or adjacent the dashboard of the vehicle. Accordingly, the monitor diode 30 is electrially connected between the signal lamp 15 and the monitor light 40 to conduct current from the signal lamp 15 toward the monitor light 40 and to block reverse current flow from the light 40 toward the signal lamp 15.

A conductor 50 extends from the power switch 14 to terminal B of relay 51. Holding coil 52 of the relay 51 is connected in series with the conductor 50 and current entering the holding coil 52 from conductor 50 leaves the holding coil through terminal B' and conductor 53 which is connected in series with left front directional signal lamp 16, through which current flows to ground. A conductor 56 extends from conductor 50 to terminal P' of the relay 51. When the holding coil 52 is energized, the terminals P-P' close and current flows from battery 12, through switch 14, conductors 50 and 56, through the terminals P'-P to conductor 57 and through a monitor diode 58 to conductor 59 which is connected to junction point 32.

A conductor 35 extends from the switch 14 to the Terminal C of holding coil 60 of relay 61, a conductor 62 extending from terminal C' of the holding coil to the right rear directional signal lamp 17 which is grounded to the chassis of the vehicle.

A conductor 63 extends from conductor 35 to the terminal Q' of relay 61, a conductor 64 extending from the terminal Q of the relay 61 to monitor diode 65. Conductor 67 extends from monitor diode 65 to junction 68. A conductor 69 extends from junction 68 to monitor light 70 which is grounded to the vehicle chassis.

A conductor 75 extends from the switch 14 to the terminal D of holding coil 76 of relay 77. Terminal D' of the holding coil 76 is connected to conductor 78 which extends to the left rear directional signal lamp 18 which is grounded to the chassis.

Conductor 79 extends from conductor 75 to terminal R' of relay 77, a conductor 80 extending from terminal R to monitor diode 81, which in turn is connected to junction point 68 by conductor 82.

A conductor 36 extends from conductor 35 to terminal E of the holding coil 83 of relay 84, the holding coil having its terminal E' connected to conductor 85 which extends to right rear trailer signal lamp 19 which is grounded to the vehicle chassis. A conductor 86 extends from conductor 36 to terminal S' of relay 84, a conductor 87 extending from terminal S to monitor diode 88. A conductor 96 extends from monitor diode 88 to conductor 97 which in turn is connected to trailer monitor light 101. Conductor 98 extends from light 101 to switch 102 which is grounded to the vehicle chassis and positioned on the control panel 106.

Conductor 89 extends from conductor 75 to terminal F of the holding coil 90 of relay 91, conductor 92 extending from terminal F' of the holding coil to the left trailer signal lamp 20 which is grounded to the vehicle chassis. Conductor 98 extends from conductor 89 to terminal T' of relay 91, the terminal T being connected by conductor 94 to monitor diode 95. Conductor 99 extends from the diode 95 to conductor 97.

It should be noted that the number of monitor lights shown herein, namely lights 40, 70 and 101, is equal to the number of pairs of directional signal lamps, a single monitor light monitoring each pair of directional signal lamps. The relays 26, 51, 61, 77, 84, and 91 serve as first, second, third, fourth, fifth and sixth current detection apparatuses, respectively one relay being associated with each directional signal lamp and monitoring the current flow to that signal lamp. Each of the relays includes a switch, the terminals of which are represented by letters O—O', P—P', Q—Q', R—R', S—S', and T—T', each switch being connected in series with the directional signal power switch 14 and with a monitor diode.

Diodes 30 and 58, 65 and 81, 88 and 95 comprise first, second and third pairs respectively of monitor diodes, each being operatively electrically connected with a directional signal lamp such that current flowing through the signal lamp will also reach the monitor diode. Each monitor diode is connected to conduct current from the directional signal lamp toward the monitor light associated with the diode but to block reverse current flow from the monitor light toward the directional signal lamp. The monitor diodes associated with the directional signal lamps comprising a pair of directional lamps, such as lamps 15 and 16, 17 and 18, or 19 and 20, are connected in parallel with one another and in series with a single monitor light.

A single monitor light may be used for each pair of directional signal lamps. The directional signal power switch 14 may be switched from an off position to a position energizing all right-turn signal lamps or alternatively to a position energizing all left-turn signal lamps; therefore right- and left-turn signal lamps will never be energized simultaneously by the power switch 14.

When the vehicle safety device 10 detects an inoperative condition of any of the directional signal lamps, the monitor light associated with the inoperative signal lamp remains unlighted, as will be further described hereafter. If has been found that an operator will detect a flashing light or audible signal more rapidly than the off condition of one of the monitor lights. Consequently an alarm apparatus 11 has been provided to insure that the operator is immediately alerted of component failure. The components of the alarm device will now be described in detail.

Conductor 107 extends from conductor 28 to power diode 108, which is connected to conductor 109 which extends to audible alarm 110. Conductor 111 extends from the alarm 110 to the emitter 110 to the emitter terminal of transistor 112. Conductor 113 extends from conductor 109 to alarm light 114 which is connected in parallel with the audible alarm 110, conductor 115 extending from the light 114 to conductor 111. A second power diode 115 is series connected to conductor 56 by conductor 117; conductor 118 connects the diode 116 to conductor 109, placing it in parallel with the power diode 108. The power diodes 108 and 116, which are a part of the alarm device 11, conduct current from conductors 28 and 56, respectively, to provide energy to the alarm apparatus 11. If the left directional signals are being utilized, diode 116 picks up the required current for the alarm apparatus, and if the right directional signal is being utilized, diode 108 conducts the required energy. The diode which is not being used at any given time blocks current flow from the energized directional signal lamps toward the unenergized directional signal lamps, thereby assuring that the unenergized directional signal lamps do not become energized from current cross-over from the energized signal lamps.

A resistor 120 is connected in series with the base of the transistor 112 and a conductor 121 extends to trailer alarm diode 122 which is series connected by conductor 123 to conductor 97. A conductor 124 extends from conductor 121 to rear alarm diode 125 which is series connected to junction point 68 by conductor 126. Conductor 126 extends from conductor 121 to front alarm diode 127 which is series connected to junction point 32 by conductor 128. Accordingly, the alarm diodes 127, 125 and 122 are connected in parallel with one another and in series with the base of transistor 112. Conductor 130 extends from the collector terminal of transistor 112 to ground.

Accordingly, the alarm apparatus 11 is comprised of conductor 107, power diode 108, conductor 109, conductor 117, power diode 116, conductor 118, audible alarm 110, alarm light 114, conductors 113, 115 and 111, transistor 112, resistor 120, conductors 121 and 125, alarm diode 127, conductor 128, conductor 124, alarm diode 125, conductor 126, alarm diode 122, and conductor 123. It should be understood that the vehicle safety device 10 may be operated satisfactorily without the of the alarm apparatus 11, but that it is highly desirable to use the apparatus 11 to assure that the operator becomes immediately aware of a signal lamp failure.

In operation, when a driver or operator actuates the directional signal power switch 14, as when a right turn is to be made, current flows from power source 12 through the switch 14 and along conductors 22 and 35, the current being delivered from switch 14 in the form of pulses to cause the directional signal lamps to flash as is conventional with modern directional signal equipment.

Current flowing along conductor 22 passes through holding coil 27 of relay 26, actuating the relay 26 as the current flows along conductor 24 to right front directional signal lamp 15 to ground, causing the lamp 15 to flash. As the relay 26 closes switch terminals 0–0', current flows from conductor 22 through conductor 28 passing through the terminals 0'–0 and leaving the relay by conductor 29. Current passing along conductor 29 flows through monitor diode 30 and along conductors 31 and 39 to front monitor light 400 and thence to ground, causing the light 40 to flash in unison with the directional signal lamp 15. The flashing of light 40 indicates to the driver or operator that the front turn signal lamp 15 is operating normally. No current flows along conductor 107 through diode 108 to the alarm apparatus 11 since the transistor 112 is in an off condition because the voltage drop between emitter and base terminals is zero, the voltage being identical at conductors 109 and 121. Accordingly, no base current flows through the transistor 112 to turn it on and the audible alarm 110 and alarm light 114 remain off.

As current flows from battery 12 along conductor 22, current also flows from the battery along conductor 35 to the holding coil 60 of relay 61 and along conductor 36 to the holding coil 83 of relay 84, actuating the relays 61 and 84 to close relay terminals Q–Q' and S–S', respectively. Current flows from the holding coil 60 of relay 61 along conductor 62 to right gear signal lamp 17 which is grounded to the vehicle chassis, causing the signal lamp 17 to flash simultaneously with the right front signal lamp 15. Since terminals Q–Q' of relay 61 are closed, current flows from conductor 35 through conductor 63, terminals Q'–Q, conductor 64, monitor diode 65, conductors 67 and 69 to right rear monitor light 70, actuating it in unison with front monitor light 40. The flashing of monitor light 70 indicates to the driver that the rear signal lamp 17 is operating normally. Because the voltage at conductors 69 and 126 is substantially equal to the voltage at conductor 109, no current flows through the transistor 112 to cause the alarm apparatus 11 to operate, and accordingly audible alarm 110 and alarm light 114 remain off.

Current from conductor 35 also flows to conductor 36, energizing the holding coil 83 of relay 84 as it flows to right rear trailer signal lamp 19 through conductor 85, causing the lamp to flash in unison with the other signal lamps described above. Current flows from conductor 36 along conductor 86, passing through the terminals S'–S of relay 84 and thence to the conductor 87 and through monitor diode 88 to conductors 96 and 97, causing the trailer monitor light 101 to flash in unison with the remaining monitor lights 40 and 70. Current leaving the monitor light 101 passes to ground through conductor 98 and closed switch 102. Since the voltage at conductors 97 and 123 is substantially equal to that at conductor 109, no current flows through the alarm apparatus 11 and the transistor 112 remains off indicating that all signal lamps are operating normally.

When a left turn is signaled by the directional signal power switch 14, current flows along conductors 50 and 75 from the switch 14 to holding coils 52, 76 and 90 of relays 51, 77 and 91, respectively, energizing each holding coil and closing the switch terminals P-P', R-R' and T-T' of the indicated relays. Because the operation of the circuit 10 is extremely similar whether right- or left-turn signal lamps are energized, the description of operation when the left-turn lamps are energized will be limited to a description of the circuit associated with the left front directional signal lamp 16. Current flows from terminal B' of holding coil 52 through conductor 53 to left signal lamp 16, energizing the lamp and passing to ground. Some of the current from conductor 50 flows along conductor 56 and through terminals P'-P passing through conductor 57, monitor diode 58, and conductors 59 and 39 to the front monitor light 40, causing it to flash. Accordingly, each time the signal lamp 16 flashes, the front monitor light 40 flashes in unison, indicating that the left-front turn signal lamp 16 is operative. So long as signal lamps 18 and 20 operate, monitor lights 70 and 101 flash in unison with light 40.

It should be understood that the diodes 108 and 116 prevent current from passing from the right directional signal lamps to the left directional signal lamps and vice versa while the device 10 is operating. Accordingly, when current passes forwardly through power diode 116, it cannot pass in the back biased direction through power diode 108. It should also be noted that the energizing current to monitor alarm light 114 and audible alarm 110 is supplied through diode 116 or 108, which obtain current from the conductors 50 or 22 which are in front directional signal lamp connections from directional signal power switch 14.

In the event any of the directional signal lamps 15, 16, 17, 18, 19 or 20 burn out or become loose in their sockets to create an open-circuit condition, the device 10 detects it as soon as the lamp fails to function. To illustrate operation when a lamp has failed, it shall be presumed that lamp 17 has become inoperative due to burn-out. When the operator signals a right turn, no current can flow through conductor 35 to holding coil 60 because there is no path for the current to follow to ground throught the lamp 176. Accordingly, the switch terminals Q–Q' of relay 61 remain open and the current from conductor 35 is prevented from passing through monitor diode 65 and reaching the rear monitor light 70, which thus remains off. Because the remaining right signal directional lamps 15 and 19 are functioning properly, current flows through the relays 84 and 26 in the manner already described for normal operation causing monitor lights 40 and 101 to light each time the signal lamps 15 and 19 flash. Since the terminals Q–Q' of relay 61 remain open, the monitor light 70 does not flash, indicating to the operator that the right signal lamp at the rear of the car or tractor is inoperative. Since the voltage at conductor 69 is substantially zero, and the voltage at conductor 109 is substantially that of battery 12, a forward bias is placed on the transistor 112, turning it on, and permitting current to flow from conductor 109 through audible alarm 110 and along conductor 113 through alarm light 114 and thence to conductors 115 and 111 and through the transistor 112 to ground 130. This causes the alarm light 114 and the audible 110 to become operative to visually and audibly alert the operator that a lamp is inoperative. By noting that monitor light 70 is not flashing, the operator can tell at once that its associated turn signal lamp 17 is inoperative.

When transistor 112 becomes forward biased, a small base current flows through the transistor 112 from conductor 111 to the resistor 120 and then through conductors 121 and 124, alarm diode 125, conductors 126 and 69 to monitor light 70 and thence to ground. This small base current is far too small to turn on the monitor light 70, but quite adequate to turn on transistor 112.

Accordingly, whenever a directional signal lamp fails, the monitor light associated with that directional signal lamp remains off and the detection apparatus or relay associated with the inoperative directional signal lamp does not close its switch. For example, if left-rear signal lamp 18 is inoperative, the switch terminals R-R' remain open and no current flows from conductor 75 through diode 81 to junction point 68. So long as switch 14 is closed, however, current does flow along conductors 50, 56, 117, through power diode 116, conductors 118 and 109 to alarm apparatus 110 and alarm light 114 and along conductor 111 to the transistor 112. The transistor senses a voltage between the emitter and base. The voltage at conductor 121 is zero; the voltage drop from the emitter to the base terminal of transistor 112 cause a small base current to flow from the base of transistor 112 through resistor 120, conductors 121 and 124, through alarm diode 125, conductors 126 and 69 and through the monitor light 70 to ground. This small base current, while inadequate to light rear monitor light 70, makes the transistor 112 conducting and accordingly current flows from conductor 111 through the transistor 112 to ground. Correspondingly, if a front directional signal lamp is inoperative, the voltage at conductor 121 will be zero and the base current from the transistor 112 will flow from conductor 121 through diode 127 to junction 32, passing therefrom to the conductor 39 and through monitor light 40 to ground. If a trailer lamp is inoperative, the voltage is conductor 121 will be zero, and base current from the transistor 112 will flow from conductor 121 through diode 122, to conductor 123, passing to ground through conductor 97, trailer monitor light 101 and switch 102.

It should be understood that the device 10 may be used with automobiles or pickup trucks with or without trailers, or alternatively may be used with truck and large trailer. If the device is to be used on an automobile without trailer, the portion of the circuit enclosed in the dotted envelope 140 may be deleted, since it is needed only to monitor a third set of directional signal lamps associated with a trailer. In the event a trailer whose lamps are being monitored is disconnected from its truck-tractor for storage or the like, the operator opens switch 102, the result of which is that the emitter to base current from transistor 112 can no longer flow from the transistor through conductor 121, diode 122, conductors 123 and 97, and through the light 101 to ground since the switch 102 is open. This prevents the transistor 112 from turning on in response to the nonoperating condition of the trailer signal lamps 19 and 20, and consequently no alarm is produced and the circuit of the device 10 comes insensitive to the absence of the trailer signal lamps 19 and 20.

Accordingly, by utilizing the device 10 the driver can check the operation of his signal lamps each time he makes a turn, and he is warned as soon as one of the directional lamps fails to operate. The warning includes both flashing alarm light 114 and audible warning sounds produced by alarm 110, so as to assure immediate alerting of the operator when trouble occurs. By noting which monitor light is off, the driver knows which signal lamp is inoperative. As a result, when the operator discovers an inoperative signal lamp he can utilize alternative signaling means such as arm signals or can take extra precautions until the lamp is repaired or replaced.

While the preferred embodiment of the present invention has been described, it should be understood that various changes, adaptations and modifications may be made therein without departing from the spirit of the invention and the scope of the appended claims.

What is claimed is:

1. In combination with a motor vehicle having a directional signal power switch connected to an electrical power supply, a vehicle safety device comprising:

first and second pairs of directional signal lamps, each of said pairs of signal lamps including a left directional signal lamp positioned on said vehicle so as to indicate a left turn when energized, and a right directional signal lamp positioned on said vehicle so as to indicate a right turn when energized, all said directional signal lamps being electrically connected to said directional signal power switch so as to be selectively energized therefrom;

first and second directional signal monitor lights positioned on said vehicle so as to be visible to an operator of said vehicle.

first, second, third and fourth current detection apparatuses, each said detection apparatus including a switch electrically connected to said power switch, each said apparatus in response to detection of current through the apparatus closing its said switch and in the absence of detection of current through the apparatus opening its said width;

said first, second, third and fourth detection apparatuses being operatively electrically connected with said left directional signal lamp of said first pair of lamps, said right directional signal lamp of said first pair of lamps, said left directional signal lamp of said second pair of lamps, and said right directional signal lamp of said second pair of signal lamps, respectively, to detect current flowing to the signal lamp to which electrically connected;

a first pair of monitor diodes having one of its said diodes operatively electrically connected to said switch of said first detection apparatus and having its remaining monitor diode operatively electrically connected to said switch of said second detection apparatus, said first pair of monitor diodes being operatively electrically connected to said first monitor light to permit current flow toward said monitor light from said first and second detection apparatuses and to block current flow from said monitor light toward said first and second detection apparatuses to thereby light said first monitor light when a directional signal lamp of said first pair of directional signal lamps is lighted to specifically indicate operation of the lighted directional signal lamp, and in the event of failure of a said directional signal lamp of said first pair of signal lamps to light when energized, said first monitor light being unenergized and thereby specifically identifying the failed directional signal lamp of said first pair; and second pair of monitor diodes having one of its said diodes operatively electrically connected to said switch of said third detection apparatus and having its remaining monitor diode operatively electrically connected to said switch of said fourth detection apparatus, said second pair of monitor diodes being operatively electrically connected to said second monitor light to permit current flow toward said monitor light from said third and fourth detection apparatuses and to block current flow from said monitor light toward said third and fourth detection apparatuses to thereby light said second monitor light when a directional signal lamp of said second pair of directional signal lamps is lighted to specifically indicate operation of the lighted directional signal lamp, and in the event of failure of a said directional signal lamp of said second pair of signal lamps to light when energized, said second monitor light being unenergized and thereby specifically identifying the failed directional signal lamp of said second pair.

2. The vehicle safety device of claim 1 wherein the said monitor diodes of said first pair of monitor diodes are electrically connected in parallel with each other and in series with said first monitor light and the monitor diodes of said second pair of monitor diodes are electrically connected in parallel with each other and in series with said second monitor light.

3. The vehicle safety device of claim 1 and further including an alarm apparatus electrically connected with said monitor lights, said alarm apparatus including an audible alarm and said apparatus sensing the absence of current flow to the said monitor lights when the directional signal power switch is on, and in response to such absence of current flow actuating said audible alarm to alert an operator, said alarm apparatus including a transistor switch having a base and further including a plurality of alarm diodes equal in number to the number of pairs of directional signal lamps, said alarm diodes being electrically connected to said monitor diodes and electrically connected in parallel with one another and in series with the base of said transistor switch to block current flow toward the base of said transistor switch, and said transistor switch being electrically connected to said audible alarm to pass current through said audible alarm when said transistor switch is in a closed condition.

\* \* \* \* \*

UNITED STATES PATENT OFFICE
CERTIFICATE OF CORRECTION

Patent No. 3,965,456          Dated June 22, 1976

Inventor(s) Robert D. Schwellenbach

It is certified that error appears in the above-identified patent and that said Letters Patent are hereby corrected as shown below:

Col. 1 Line 45: Delete "electrical" and substitute --electrically--.
Col. 2 Line 26: Delete "from" and substitute --form--.
Col. 2 Line 50: After "with" insert --conductor 29 and--.
Col. 3 Line 45: Delete "98" and substitute --93--.
Col. 3 Line 55: After "respectively" insert --,--

Col. 4 Line 31: Delete the second occurring "110 to the emitter".
Col. 4 Line 36: Delete "115" and substitute --116--.
Col. 5 Line 3: Delete "125" and substitute --126--.
Col. 5 Line 7: After "the" first occurrence insert -- use --.
Col. 5 Line 27: Delete "400" and substitute --40--.
Col. 5 Line 45: Delete "gear" and substitute --rear--.
Col. 6 Line 41: Delete "in" and substitute --the--.
Col. 6 Line 52: Delete "176" and substitute --17--.
Col. 7 Line 5: After "audible" insert --alarm--.
Col. 7 Line 30: After "voltage" insert --difference--.
Col. 7 Line 47: Delete "is" and substitute --at--.
Col. 8 Line 2: Delete "comes" and substitute --becomes--.
Col. 8 Line 44: Delete "width" and substitute --switch--.

Signed and Sealed this

Second Day of November 1976

[SEAL]

Attest:

RUTH C. MASON
*Attesting Officer*

C. MARSHALL DANN
*Commissioner of Patents and Trademarks*